C. ALTMAN.
VEHICLE WHEEL.
APPLICATION FILED FEB. 27, 1912.
1,051,053.
Patented Jan. 21, 1913.
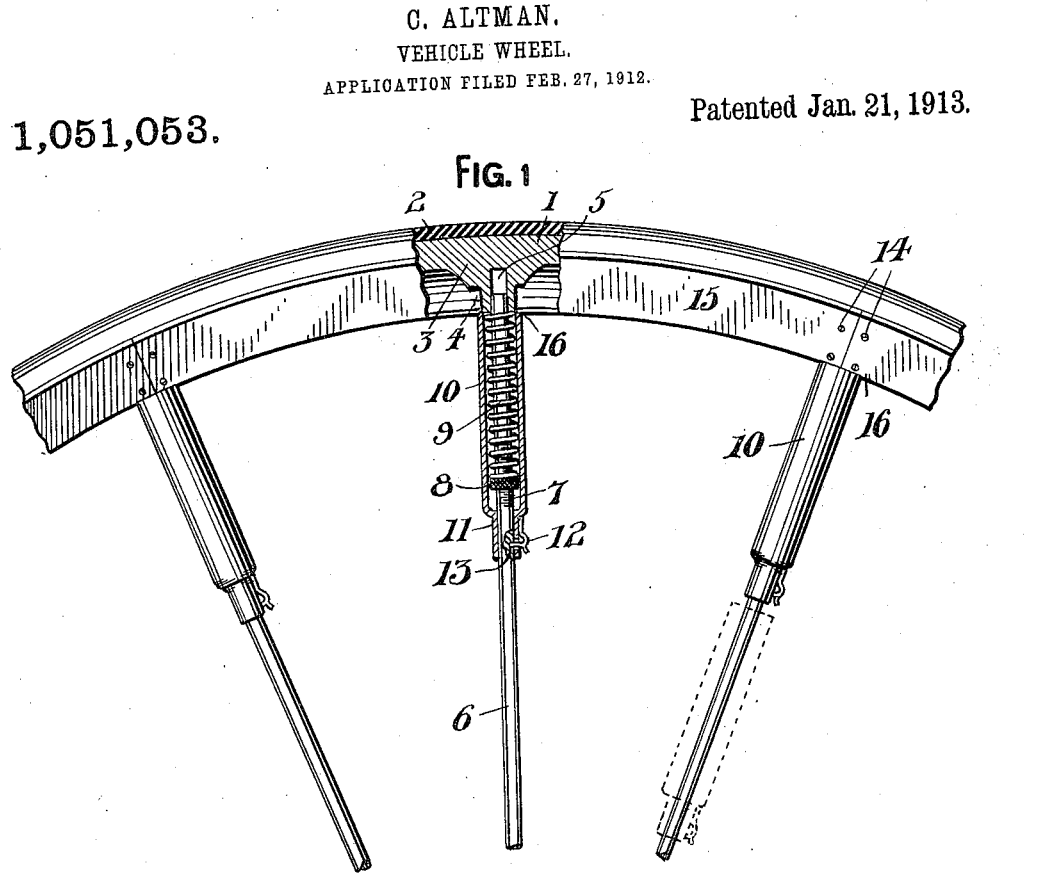
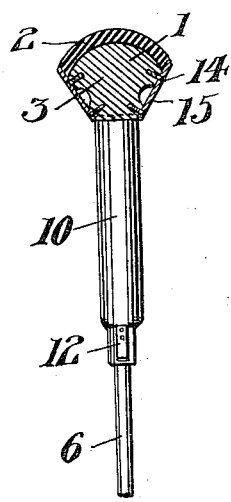
WITNESSES
INVENTOR
C. Altman
BY
ATTORNEYS

UNITED STATES PATENT OFFICE.

CHARLES ALTMAN, OF WILBER, NEBRASKA.

VEHICLE-WHEEL.

1,051,053.

Specification of Letters Patent. Patented Jan. 21, 1913.

Application filed February 27, 1912. Serial No. 680,234.

*To all whom it may concern:*

Be it known that I, CHARLES ALTMAN, a citizen of the United States of America, residing at Wilber, in the county of Saline and State of Nebraska, have invented certain new and useful Improvements in Vehicle-Wheels, of which the following is a specification, reference being had therein to the accompanying drawing.

This invention relates to vehicle wheels, and more particularly to that type of wheel used in connection with automobiles, motor trucks, and similarly operated vehicles.

The primary object of my invention is to furnish a wheel with positive and reliable means, as will be hereinafter set forth, for cushioning the felly or rim of a wheel relatively to the spokes thereof, obviating the necessity of using pneumatic tires for accomplishing the same purposes.

Another object of this invention is to provide the spokes of a wheel with a spring supported felly or rim that increases the roadworthiness of a vehicle by eliminating punctures, blow-outs, and such accidents and delays that are incurred by using a pneumatic tire in connection with a vehicle wheel.

A further object of this invention is to provide a vehicle wheel of the above type that is durable, inexpensive to manufacture, dust-proof, and highly efficient for the purposes for which it is intended.

The principles of the invention are illustrated in the accompanying drawing, wherein:—

Figure 1 is a side elevation of a portion of a wheel partly broken away and partly in section, and Fig. 2 is a cross sectional view of the same.

A wheel in accordance with this invention comprises a rim or felly 1 upon which is mounted a tire 2, preferably of solid rubber, the tire being suitably secured to the rim or felly whereby it cannot become accidentally displaced.

The inner side of the rim or felly 1 is provided with circumferentially arranged and equally spaced socket members 3 having reduced ends 4 provided with sockets 5. Extending into the sockets 5 are the outer ends of cylindrical spokes 6, said spokes having threaded portions 7 intermediate the ends thereof. The position of the ends of the spokes so that they can slide within the sockets 5, will allow the spokes to flex between the hub and the sockets when the spokes are in a horizontal position.

Screwed upon the threaded portions 7 of the spokes 6 are knurled nuts 8 and encircling said spokes, between the nuts 8 and the reduced ends 4 of the members 3, are coiled compression springs 9, said springs retaining the rim or felly in a normally extended position relatively to the ends of the spokes 6.

Inclosing the springs 9 are sleeves 10 which are made of leather or other suitable material and which at their outer ends are of a sufficient diameter to telescope the reduced ends of the socket members 3, the inner ends of the sleeves 10 are reduced as at 11 to snugly fit the spokes 6 inwardly with respect to the nuts 8. To prevent longitudinal shifting of the sleeves 10 upon the spokes 6, the reduced ends 11 of said sleeves are provided with pivoted latches 12, which extend through said reduced ends 11 and engage in notches or seats 13 provided therefor in the spokes 6. As the sleeves 10 are flexible they do not interfere with the flexing of the spokes 6. The springs 9 as is obvious do not interfere with the flexing of the spokes 6. By opening the latches 12, the sleeves 10 can be shifted to expose the knurled nut 8, whereby said nut can be adjusted upon the threaded portions 7 of the spokes 6 to increase or decrease the tension of the springs 9. It is therefore obvious that through the medium of the adjustable nuts 8 that the cushioning movement of the rim or felly 1 relatively to the outer ends of the spokes 6 can be regulated.

Secured to the socket members 3 by screws 14 or other fastening means are the abutting ends of segment-shaped side plates 15, said side plates having the abutting ends thereof shaped, as at 16 to provide clearance for the outer ends of the sleeves 10 and the reduced ends 4 of the socket members 3. As illustrated in Fig. 2, the side plates 15 can assist in retaining the tire 2 in engagement with the rim or felly 1, said side plates engaging the edges of the tire.

Any suitable means as flat springs or the like can be employed for retaining the latches 12 in engagement with the spokes 6 and the sleeves 10 inclosing the springs 9. The sleeves 10 prevent the springs 9 from being injured by stones or the operation of said springs impaired by dust or other matter.

While I have herein described a preferred embodiment of the invention, it is to be understood that the structural elements thereof are susceptible to such changes as in the size, shape and manner of assemblage, as fall within the scope of the appended claim.

What I claim is:—

A vehicle wheel comprising a rim circumferentially arranged and spaced socket formed members secured to the rim, spokes having the outer ends thereof shiftably extending into said members, nuts adjustably mounted upon said spokes, springs encircling said spokes and interposed between said nuts and said members and sleeves formed of yieldable material mounted upon said spokes for inclosing said springs, and latches for adjustably connecting the inner ends of the sleeves to the spokes.

In testimony whereof I affix my signature in the presence of two witnesses.

CHARLES ALTMAN.

Witnesses:
 Joe. Cuny,
 J. C. Simos.

Copies of this patent may be obtained for five cents each, by addressing the "Commissioner of Patents, Washington, D. C."